United States Patent
Flett

(10) Patent No.: US 9,270,217 B2
(45) Date of Patent: Feb. 23, 2016

(54) COMBINATION CHARGER AND MOTIVE POWER DEVICE

(71) Applicant: Quantum Fuel Systems Technologies Worldwide Inc., Lake Forest, CA (US)

(72) Inventor: Fred Flett, Indio, CA (US)

(73) Assignee: Quantum Fuel Systems Technologies Worldwide, Inc., Lake Forest, CA (US)

( * ) Notice: Subject to any disclaimer, the term of this patent is extended or adjusted under 35 U.S.C. 154(b) by 0 days.

(21) Appl. No.: 14/285,639

(22) Filed: May 23, 2014

(65) Prior Publication Data

US 2014/0340004 A1 Nov. 20, 2014

Related U.S. Application Data

(63) Continuation of application No. 13/665,070, filed on Oct. 31, 2012, now Pat. No. 8,836,289.

(60) Provisional application No. 61/562,849, filed on Nov. 22, 2011.

(51) Int. Cl.
*H02P 1/00* (2006.01)
*H02P 7/06* (2006.01)
*H02P 27/08* (2006.01)
*B60L 11/18* (2006.01)
*H02J 7/02* (2006.01)

(52) U.S. Cl.
CPC .............. *H02P 7/06* (2013.01); *B60L 11/1803* (2013.01); *B60L 11/1811* (2013.01); *B60L 11/1814* (2013.01); *H02J 7/02* (2013.01); *H02P 27/08* (2013.01); *Y02T 10/642* (2013.01); *Y02T 10/7005* (2013.01); *Y02T 90/127* (2013.01); *Y02T 90/14* (2013.01)

(58) Field of Classification Search
CPC ... H01M 10/44; H01M 10/46; B60L 11/1803; B60L 11/18
USPC .............. 318/139, 599, 811, 400.26, 400.27, 318/400.28, 400.29, 400.3; 320/27, 30, 49, 320/50, 57, 58, 59, 107, 137, 128, 130, 141, 320/142, 145, 155, 158, 163, 116
See application file for complete search history.

(56) References Cited

U.S. PATENT DOCUMENTS

| | | | | |
|---|---|---|---|---|
| 4,920,475 A | * | 4/1990 | Rippel | 363/132 |
| 5,629,603 A | * | 5/1997 | Kinoshita | B60L 11/1803 180/65.8 |
| 5,952,812 A | * | 9/1999 | Maeda | 318/803 |
| 6,331,365 B1 | * | 12/2001 | King | 429/9 |
| 8,466,652 B2 | * | 6/2013 | Klaes | 320/107 |
| 2002/0047686 A1 | | 4/2002 | Kodama et al. | |
| 2011/0050174 A1 | * | 3/2011 | King et al. | 320/134 |

* cited by examiner

*Primary Examiner* — Antony M Paul
(74) *Attorney, Agent, or Firm* — Baker & Hostetler LLP

(57) ABSTRACT

A combined battery charger and motor driver circuit assembly includes a rechargeable battery, a traction motor configured to accept a pulse-width-modulated (PWM) drive, a PNP transistor array, a charging source of chopped and rectified DC, and a control circuit configured to apply a discrete PWM drive signal to the gate of each transistor in the PNP transistor array.

3 Claims, 11 Drawing Sheets

COMBINATION CHARGER AND MOTIVE POWER DEVICE

CROSS REFERENCE TO RELATED APPLICATIONS

This application is a continuation of U.S. patent application Ser. No. 13/665,070, filed Oct. 31, 2012, currently pending, the contents of which are incorporated in its entirety. U.S. patent application Ser. No. 13/665,070 claims benefit under 35 U.S.C. §119(e) of U.S. Provisional Patent Application No. 61/562,849, filed Nov. 22, 2011.

BACKGROUND

1. Field

A combined power switching system for charging and operating battery-powered electric traction motors is disclosed.

2. General Background

Most power-using transportation vehicles—specifically, power-propelled surface vehicles, such as automobiles, motorcycles, wheeled and tracked recreational vehicles, buses, trucks, and trains; water-borne vehicles, such as commercial and recreational boats and ships, buoys, manned and unmanned submersibles, etc.; and aerial vehicles, such as airplanes, airships, and balloons—combine a need for storage of potential energy and a need to convert that energy into a readily-used form. Such advantage as may be gained from small size and low mass constrains storage and conversion apparatus. For a few centuries, wood, followed by coal, then diesel fuel, has been burned in air to release heat to generate steam that directly drive locomotives over rails. A portion of power for rail transportation—now virtually all of that power—has been supplied in the form of electricity from remote or on-board power generators, or in the form of torque from diesel-fuel powered shaft-output engines. For about a century, much of the world-wide transportation network has used the burning of gasoline, diesel fuel, and/or alcohol to generate shaft torque to directly drive vehicles over roads, as well as powering ships, aircraft, etc.

For the last few decades (i.e., for 20-30 years, plus limited experimentation since ca. 1900), combustible gases (methane, hydrogen, etc.) and stored electricity have been applied to powered vehicles in place of complex hydrocarbons, in pursuit of benefits such as reversal of trends of habitat destruction, and to advance development of ecologically-sound (sometimes termed "green") technologies. Specific "green" vehicle applications include rechargeable electric power sources for surface vehicles and hybrid versions thereof. The latter typically use both in-vehicle combustion technology and stored electricity, ultimately to provide shaft torque for wheel or propeller-driven propulsion.

The components used for battery-powered and hybrid vehicles suffer performance penalties when the relatively high volumetric and mass efficiency of liquid fueled combustion engines is compared to the low energy density of batteries and the further penalty hybrids have from carrying both technologies and using them either in alternation or simultaneously. Acceleration and wind drag penalties attributable to extra mass and volume are known to offset "earth friendly" benefits to a variable degree. To a greater extent than designers of vehicles using liquid-fueled combustion engines, which generally receive oxygen for combustion from the air and discharge their combustion products back into the air with impunity, designers of electric-powered vehicles commonly pay considerable attention to minimizing waste heat, which begins as stored chemical energy in battery systems, and which is dissipated in lieu of extending vehicle travel range.

Increasing storage system (i.e., battery) energy density and reducing mass of components other than the storage system, managing thermal spikes, cooling components that enable necessary actions such as battery charging, and providing power for motive force are desiderata.

DISCLOSURE

In accordance with some exemplary implementations, a combined battery charger and motor driver circuit assembly is shown. The circuit assembly includes a rechargeable battery having positive and negative output terminals and a traction motor configured to accept a pulse-width-modulated (PWM) drive that includes a pattern with at least two phase inputs. The circuit assembly further includes a PNP transistor array that includes a first pair having a first transistor, whereof the collector is connected to the battery positive terminal, whereof the emitter is connected to a tie point whereto is connected the collector of a second transistor, the emitter of the second transistor being connected to the battery negative terminal, the array further including a number of pairs that is the same as the number of phase inputs the traction motor is configured to accept and the transistors each having a freewheeling diode connected from emitter to collector thereof. The circuit assembly further includes a charging source of chopped and rectified DC having positive and negative output terminals, the positive output terminal being connected to the tie point of at least one pair in the PNP transistor array, the negative terminal being connected to the battery negative terminal, and the charging source being configured to alter the chop function in response to alteration of a level control signal, and a control circuit configured to apply a discrete PWM drive signal to the gate of each transistor in the PNP transistor array, the drive signal being applied to all of the transistors of the array when the battery is driving the motor, and the control circuit applying a second pattern to the gate of at least one transistor when the charging source is charging the battery.

In accordance with some exemplary implementations, a method for combining a battery charger and an inverter in a motor driver circuit is shown. The method includes establishing a source of portable, rechargeable electrical power with a positive and a negative terminal, establishing a converter for a mains power source that chops and rectifies modulatable DC power at a level compatible with recharging the rechargeable source, and defining a load having the electrical load characteristics of a traction motor, the load accepting a pulse-width-modulated (PWM) AC signal with a plurality of phases. The method further includes establishing an array of pairs of PNP transistors, with each pair joined at a tie point between the emitter of a first one and the collector of a second one, with the collectors of the first transistors of the respective pairs tied together and further tied to the positive terminal of the portable source, with the emitters of the second transistors of the respective pairs tied together and further tied to the negative terminal of the portable source, and with the tie points connected to the respective phases of the load, providing a separate PWM control signal to each gate that turns each transistor on and off at times that collectively apply to the load a drive signal with the number of phases and the power levels for which the load is defined, and providing a charge function from mains power that recharges the portable source from at least one tie point, and that applies at least one pattern of transient pulses to a gate of a second transistor of a pair, the timing of the transient pulses being synchronized to the chop timing of the mains power converter.

There have thus been outlined, rather broadly, certain exemplary implementations of the present disclosure, in order that the detailed description thereof herein may be better understood, and in order that the present contribution to the art may be better appreciated. There are, of course, additional implementations of the disclosure that will be described below and which will form the subject matter of the claims appended hereto.

In this respect, before explaining at least one implementation of the disclosure in detail, it is to be understood that the disclosure is not limited in its application to the details of construction and to the arrangements of the components set forth in the following description or illustrated in the drawings. The disclosure is capable of implementations in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for the designing of other structures, methods, and systems for carrying out the several purposes of the present disclosure. It is important, therefore, that the claims be regarded as including such equivalent constructions insofar as they do not depart from the spirit and scope of the present disclosure.

DRAWINGS

The above-mentioned features of the present disclosure will become more apparent with reference to the following description taken in conjunction with the accompanying drawings, wherein like reference numerals denote like elements. All callouts and text set forth in the figures are hereby incorporated by this reference as if fully set forth herein.

FIG. 3 is further detailed in FIGS. 3-1, 3-2, and 3-3.

FURTHER DESCRIPTION

Figure 1:
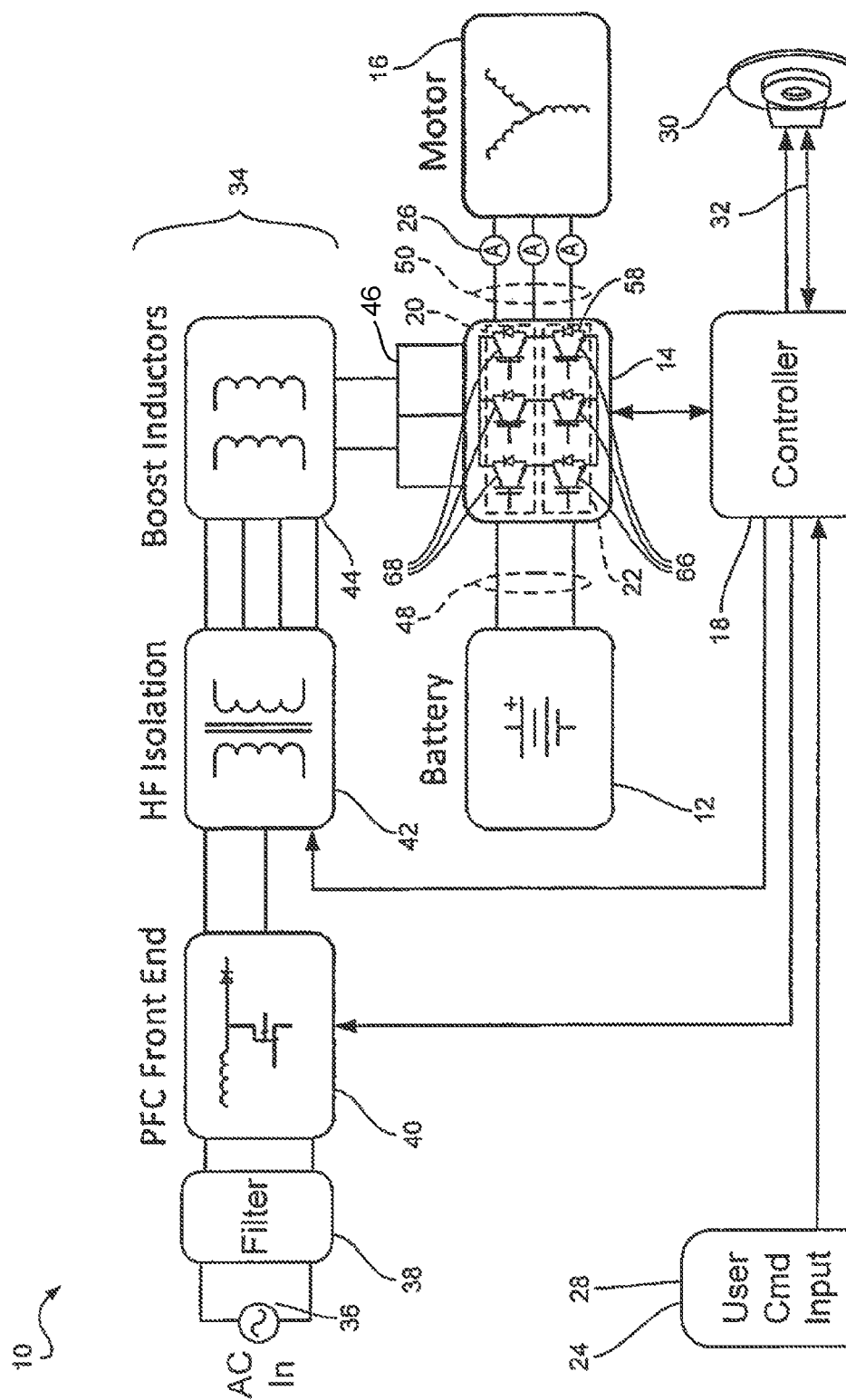
FIG. 1 is a block diagram of a system integrating an electric-powered vehicle and a support subsystem therefor, according to some aspects of an exemplary implementation.

FIG. 1 shows in block diagram 10 an arrangement for a pure-electric apparatus, which includes, but is not limited to, a motor vehicle, having a rechargeable storage battery 12 that is charged by mains power and reversibly discharged through one or more traction motors (which are motors used to provide propulsion) to increase and decrease the kinetic energy of a vehicle (i.e., to accelerate and regeneratively brake the vehicle). The block diagram includes a battery 12, such as an array of cells electrically coupled together in some series-parallel arrangement selected to be effective for satisfying a combined requirement for level and duration of output voltage and current. Traditionally, the connection of secondary (rechargeable) cells or series cell stacks in a parallel configuration tends to cause the voltages of the cells or cell stacks to equalize at a rate that is potentially destructively high for any cells not fully discharged, and that simple forms of connection generally fail to take full advantage of the capacity of the most capable individual cells.

The battery 12 drives an inverter 14, discussed in greater detail below. The inverter 14 output is an n-phase switched waveform directed to an electric motor 16 compatible with the inverter 14 output. The three-phase example in FIG. 1 should not be viewed as limiting. A control unit 18 determines the timing and relative phase of the plurality of output waveforms by turning each of the switches 20, 22 of the inverter 14 on and off at times that realize the instantaneous power commanded through operator command input 24 (analogous to gas pedal or throttle position) and compared to sensed motor current 26 (analogous to torque feedback, manifold vacuum, camshaft and crankshaft position sensor output, and other internal combustion (IC) engine properties). Power waste can be kept low by using digital control, with each switch device 20, 22 on or off, and with power output being varied by pulse width modulation.

Braking can be realized by the control unit 18 accepting a braking command signal from a user braking input 28, a collision avoidance detection device, or the like. Available vehicle kinetic energy recapture uses the inverter 14 to direct recoverable energy from the motor 16 to the battery 12. Recapture is rate-limited to the overall system's net energy recapture capability. In addition to recapture, braking can be regenerative, with non-recoverable system kinetic energy dissipated as heat in the motor 16, and conventional (mechanical friction) brakes 30, likewise thermal dissipative, can be applied under computer control, via overrides, etc., with or without antilock-braking system (ABS) 32 modulation. Functions of the control unit 18 in the above accelerating and braking modes substantially resemble those performed by similar systems used by other battery-powered traction motor-propelled vehicles.

In order to recharge a battery 12 from a mains supply 36 or from other equivalent sources, a vehicle charging circuit not incorporating an implementation of the present disclosure would require use of a separate charging circuit 34, accompanied in most implementations by a mechanical interlock configured to isolate the mains supply source 36, the battery charge path 48, and the battery 12 from the motor drive path 50. It is to be understood that photovoltaic (PV) sourcing, fuel-cell- or combustion-powered sourcing of electricity (i.e., hybrid), and other off-grid technologies may be operationally equivalent to rectification and conditioning of a mains supply 36 for the charging aspect of the implementations disclosed herein. Some off-grid technologies may also sidestep certain aspects of charging from mains supply 36, such as power factor correction. A more extreme form, namely physical exchange of a discharged for a fully charged battery, where used as a sole method for delivering energy to a vehicle, may reduce need for some aspects of the concept disclosed.

Figure 2:
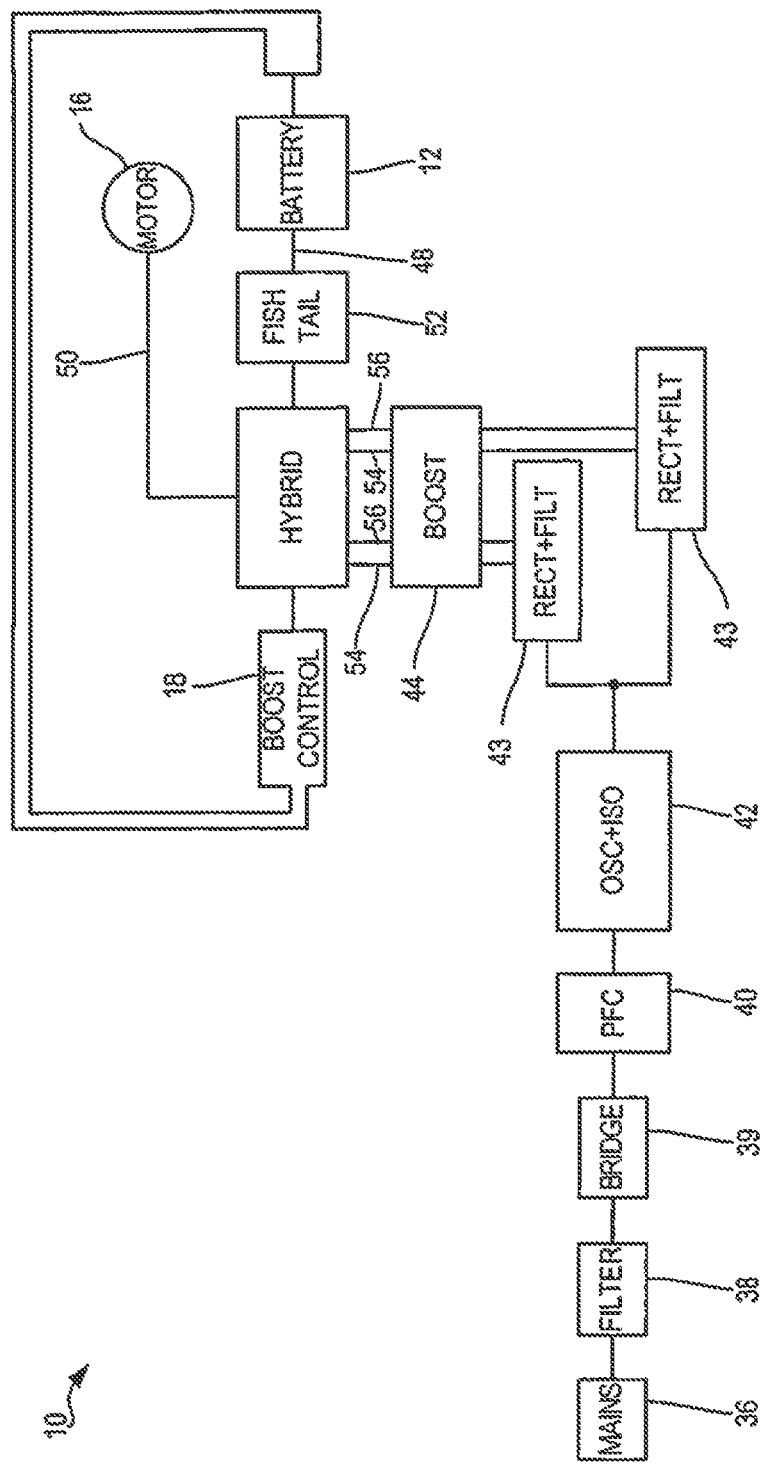
FIG. 2 is an alternative block diagram of the system of FIG. 1.

FIG. 2 illustrates some aspects of FIG. 1. As shown in FIG. 2, a front-end filter 38 may be included in the charging circuit to provide bidirectional noise suppression, and a power factor correction circuit (PFC) 40 of generally conventional design may be employed as needed to satisfy local power factor regulatory requirements. Typical AC-to-DC converters, such as those used in welders, battery chargers, etc., appear significantly inductive to a mains source 36, and compensation using a PFC 40 can beneficially reduce apparent loading by resynchronizing voltage and current. A typical PFC 40 circuit may use a moderate-frequency chopping circuit (approximately a multiple of mains frequency in the low super-audio range) that manipulates voltage-to-current phase from the highly inductive charger load until the power factor is close to unity.

The PFC 40 in FIG. 1 is shown to be followed in this implementation by a boost regulator that may include another bridge rectifier, an oscillator, and an isolation circuit 42, the latter in the form of a transformer, for example. This is followed by two rectifier and filter groups 43 that feed boost inductors 44. In the exemplary implementation shown, the PFC 40 output energizes circuit in which a pulse-width modulated power oscillator drives the primary of a transformer with isolated secondaries (all in block 42 of FIG. 2). This beneficially isolates the charging system from the mains supply 36, a property that may be required for regulatory agency approval.

The transformer (in block 42) has two secondary windings for parallel charging circuits. Timing of the power oscillator in the circuit 42 establishes a single operating frequency that may be optimized for the voltage and load current range required. A controller (not shown in FIG. 2) provides pulse-width modulation control signals to apply current to the transformer primary; the signals collectively provide a combination of voltage and current compatible with the instantaneous requirement for charging the battery 12. This moment-by moment regulated AC waveform is again rectified and filtered 43, providing a DC level compatible with charging the battery 12 from its present state of charge. The boost inductors 44 function as current flywheels in conjunction with the shunt capacitors in the fishtail 52, further discussed below. The exemplary implementation shown has two charger outputs, each of which has the form of a positive node 54 and a negative node 56. In some exemplary implementations, the number of separate transformer secondaries, boost inductors 44, etc., used to drive the battery 12 may be one, three, or another number at user option. In some implementations, controller-based timing of current pulses from respective outputs may be offset from one another (i.e., not simultaneous) to reduce harmonic energy.

It is to be understood that the term "boost regulator" as ordinarily used for a switch mode power supply refers to a specific class of circuit that has an output higher than its input. In some exemplary implementations, however, a "buck" regulator, or a combined "buck-boost" regulator may be required for an application, such as a system operating from a high mains power voltage 36 and charging a low-voltage battery 12 (buck), or one in which the source voltage may be above or below the battery voltage under different operating conditions (buck-boost). For the purposes of this specification, the term "boost" regulator includes both of the other configurations.

Referring again to FIG. 1, the charger output nodes 54, 56 are not connected directly to the battery 12, which could necessitate employing a mechanical disconnect to switch over to motor operation function. Instead, the charger output nodes 54, 56 are connected to the midpoints of series-stacked IGBTs 20, 22, specifically the collectors 68 of the upper IGBTs 20 and the emitters 66 of the lower IGBTs 22. Each IGBT includes a robust freewheel diode 58.

Traditionally, the freewheel diodes 58 are likely to be silicon or gallium arsenide devices, which are well characterized for applications applying loads such as those of some exemplary implementations of the disclosure, namely a few hundred volts at a few hundred amperes. It is anticipated that still more robust rectifier technology may be imminently forthcoming, using the above or another material, such as Silicon Carbide (SiC). SiC exhibits exceptional energy density and effectively nil reverse recovery time, promising to place it among the most useful of materials capable of being configured as Schottky diodes, once it achieves satisfactory power levels and price points for consumer applications. With a sufficiently mature semiconductor technology, selection of Schottky or another low-forward-drop diode type lowers dissipation of charging energy within the hybrid envelope in the form of waste heat. The freewheel diodes 58 of the upper IGBTs 20 of FIG. 1 pass filtered DC to the battery 12 during charging. The same diodes 58 may be called upon to serve as snubbers during motor driving, as discussed in greater detail below.

The diode-equipped IGBT devices 20, 22 that act as parts of the battery charging function also serve in the motor driving function. In the latter function, all six IGBT devices 20, 22 are active, generally in patterns of three, with each of the three motor windings either momentarily switched to the battery positive or negative terminal or momentarily allowed to float as a succession of pulses from the controller 18 to each IGBT establishes three-phase pulse width modulated excitation of the motor 16. It is to be understood that at no time should both IGBT devices of a pair (i.e., an upper 20 and a lower 22) be actuated simultaneously, which would establish a direct, wasteful, and potentially destructive short circuit between the battery positive and negative terminals. As also noted elsewhere herein, the number of motor windings, and therefore the number of IGBT pairs 20, 22 used to drive the respective motor windings in alternation to the positive or negative battery rail, may be a user option, influenced by such considerations as availability of multiple-kilowatt (multiple-horsepower) motors with particular numbers of windings, by availability of off-the-shelf IGBT hybrid packaging with adequate thermal coupling to support particular numbers of IGBTs, etc.

The same controller function (and optionally the same controller 18) that provides timed pulse width modulation to the six IGBT devices 20, 22 in some exemplary implementations of the disclosure, such as that shown in FIG. 1, can also be applied to provide pulse width modulated reverse drive for regenerative braking—i.e., where kinetic energy in the vehicle system is present in the form of a voltage on the motor windings, and momentary connection through each of the IGBTs at a time that presents a like polarity and greater voltage to the battery. Such a charge pulse serves to recharge the battery and applies reverse motor torque. Regenerative braking may be performed in response to pressure on or displacement of a "brake" pedal, reduction of "throttle" or "gas" pedal pressure below a threshold representing maintenance of constant speed, detection of an imminent road hazard by a forward-looking sensor, cruise control overspeed compensation, etc. At the limits of regenerative braking, the controller may combine dynamic braking (i.e., short-circuiting the motor with the battery isolated, so that back EMF converts rotational speed to reverse torque) with application of reversing power from the battery and actuation of mechanical brakes, all such methods further modulated by antilock braking control systems and other automotive safety functions.

The above operation is somewhat conventional, although described in such a way as to emphasize exemplary implementations that incorporate the present disclosure. A particular aspect of the charging function in some exemplary implementations is the presence of six IGBT devices 20, 22 (or another multiple of two), all of which are used to drive the motor 16. Each IGBT includes a shunt diode connected from emitter to collector. These freewheeling diodes 58 carry battery charging current during charging from mains power 36.

A representative battery charging waveform, generated from mains power and applied via the IGBT freewheeling diodes 58, may be expected to have appreciable residual switching noise as filtered by typical charger circuitry, such as that discussed above. The noise component of the charging waveform includes switching transients with appreciable energy at multiples of the charger switching frequency—i.e., harmonics—that manifest as voltage and current spikes known to shorten battery life. Such harmonics are preferably suppressed, but passive apparatus for filtering of lower-order harmonics in power circuits, which harmonics may both contain appreciable energy and be more difficult to filter, can be physically large, costly, and wasteful of energy.

Figure 3:
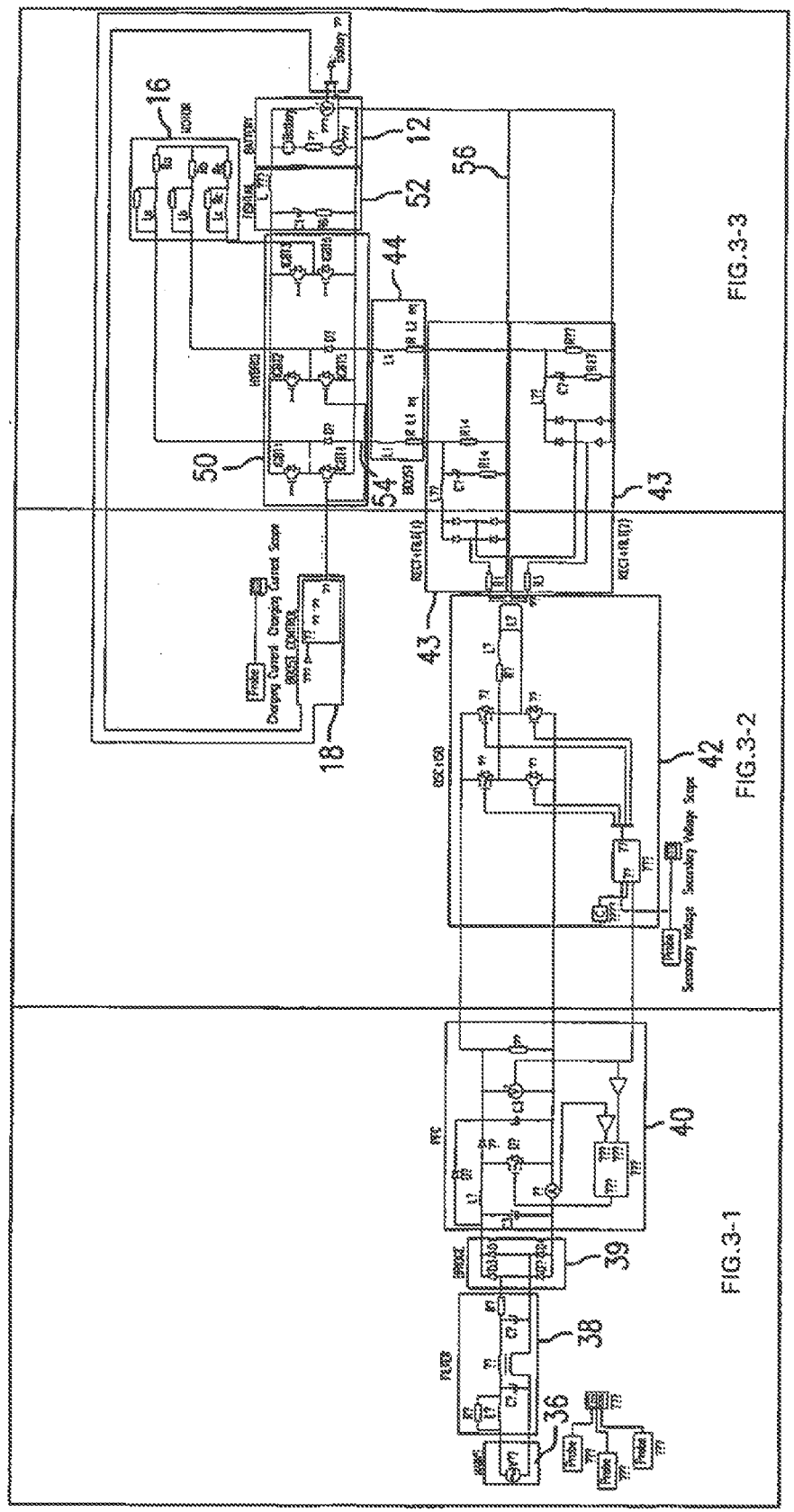
FIG. 3 is an overlay of a schematic diagram on the block diagram of FIG. 2.
Figures 1, 3:
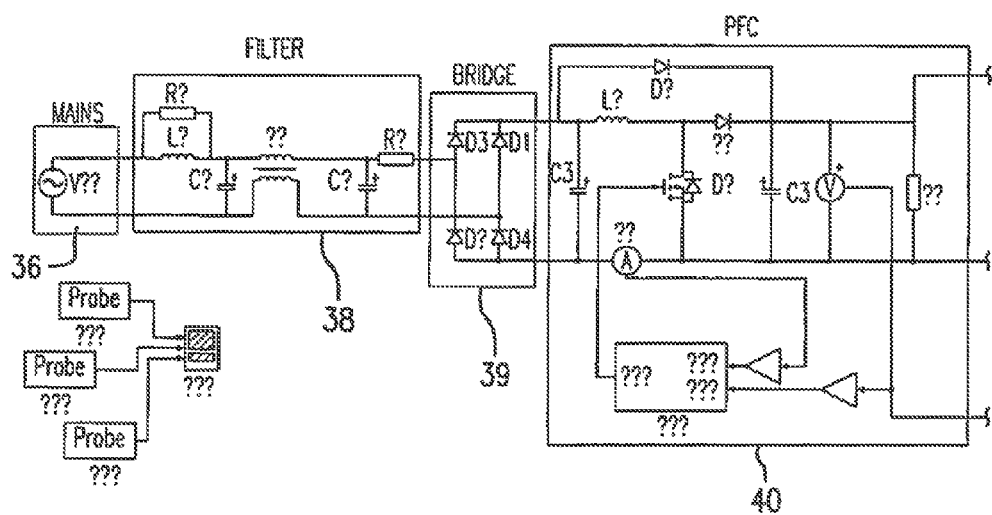
Figures 2, 3:
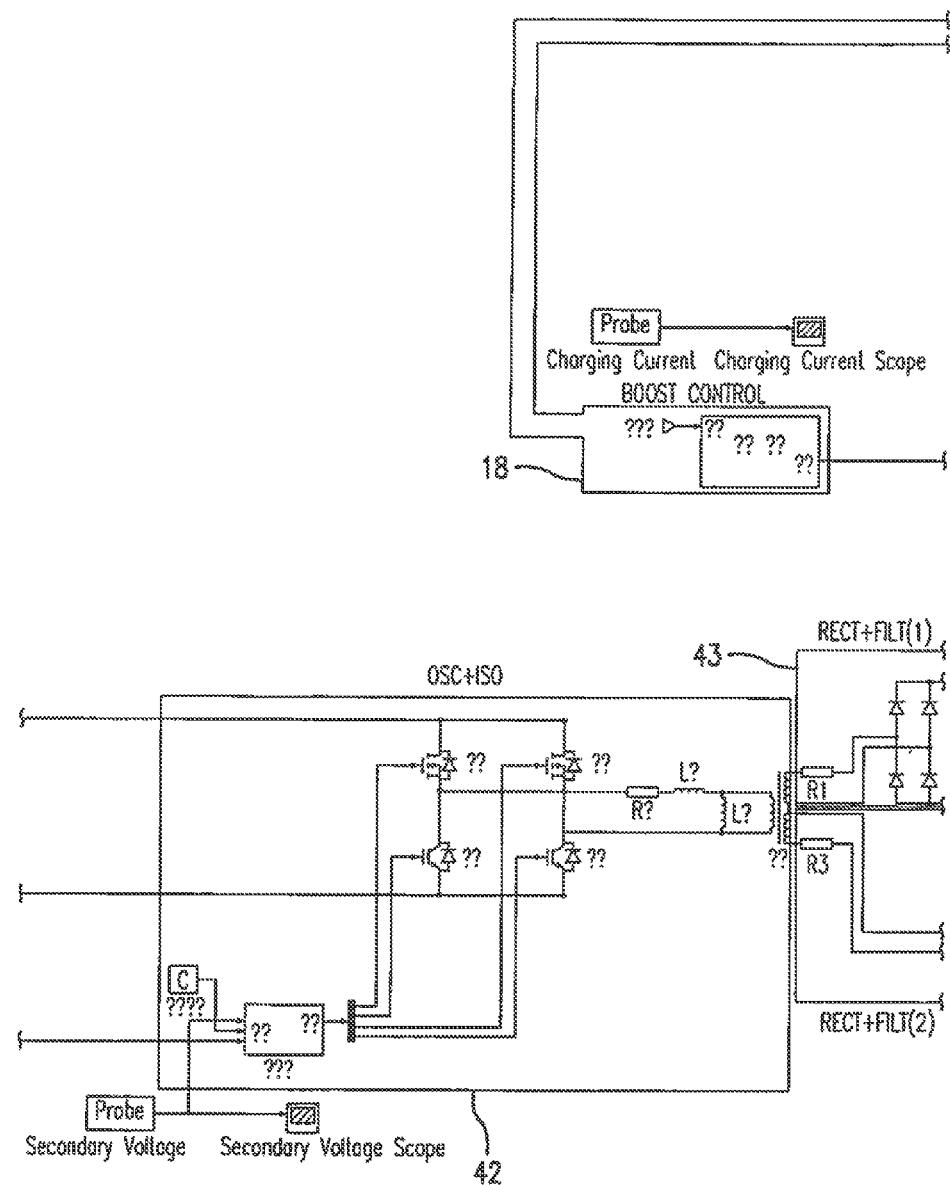
Figure 3:
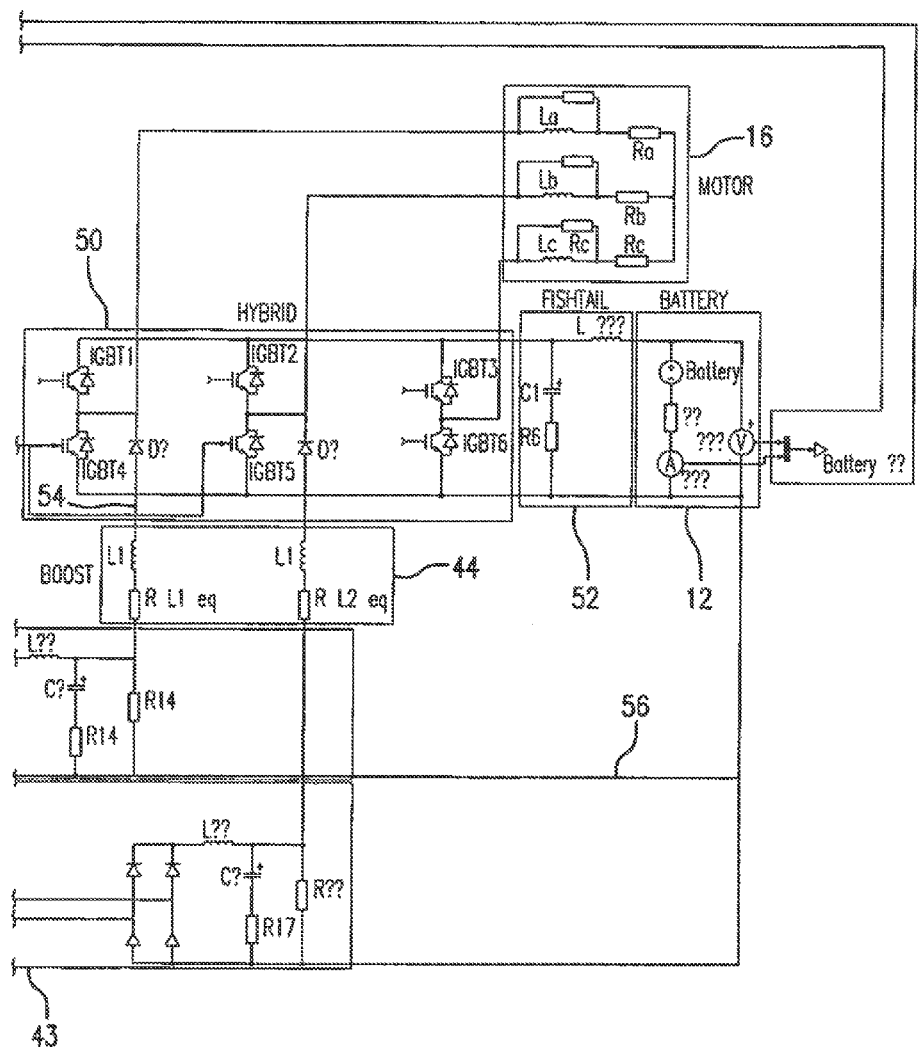

FIG. 3 is an end-to end schematic diagram of an exemplary implementation of the disclosure. FIG. 3 includes the same blocks as FIG. 2, with their internal circuits also shown. Operation according to the schematic involves using two sets of insulated-gate bipolar transistors (IGBTs) 20, 22 to realize a combined motor driver and battery charger circuit, which contrasts with common practice. In some exemplary implementations of the disclosure, during charging of the battery 12, the control unit 18 provides switch mode power supply (SMPS) control signals to the two of the upper IGBTs 20 that are connected from a mains supply 36 via a filter 38 to the isolation circuit 42 windings, and then via the rectifier-filters 43 to the boost inductors 44. The two active IGBTs 20 (identified in FIG. 1; the relative position is the same) provide substantially equal current pulses, which may be alternating, to the battery 12, at a voltage compatible with the battery's allowable rate of charge at its instantaneous state of charge. The circuit has sufficient series inductance and shunt capacitance to keep ripple and switching noise in the charge waveform at a low level, which can extend service life of the battery 12.

Figure 4:
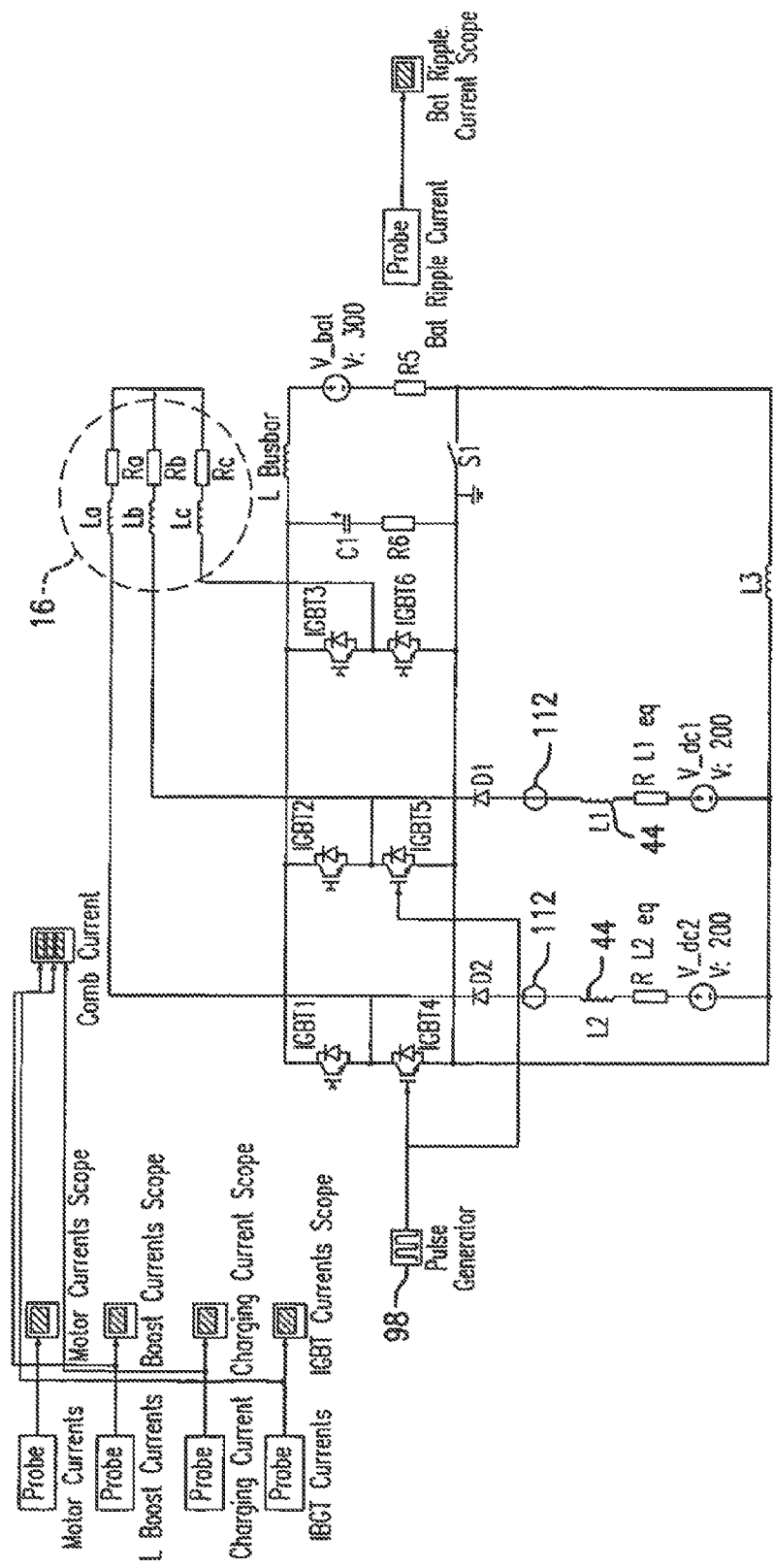
FIG. 4 is a first topology of the driver circuit.
Figure 5:
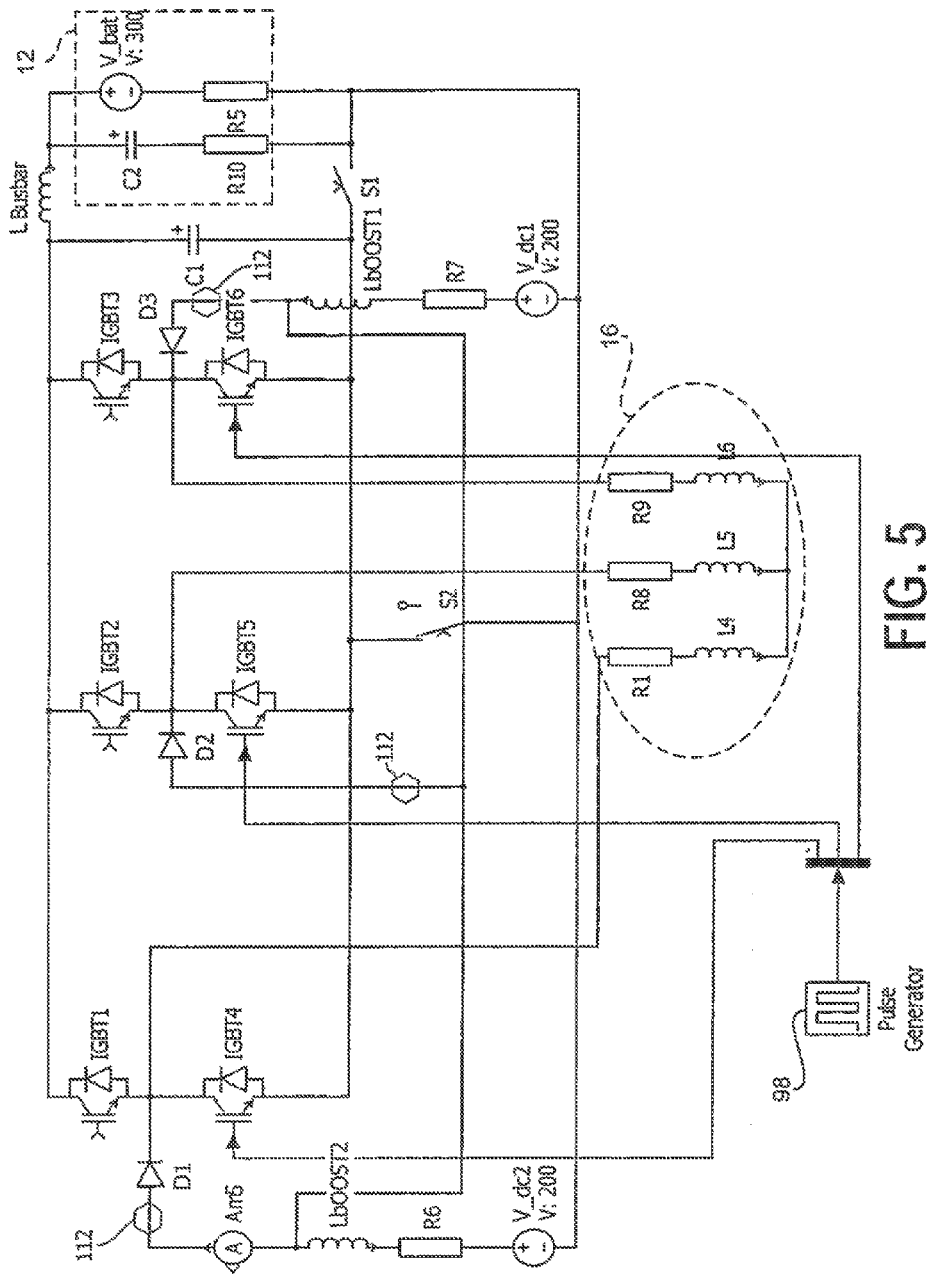
FIG. 5 is a second topology of the driver circuit.
Figure 6:
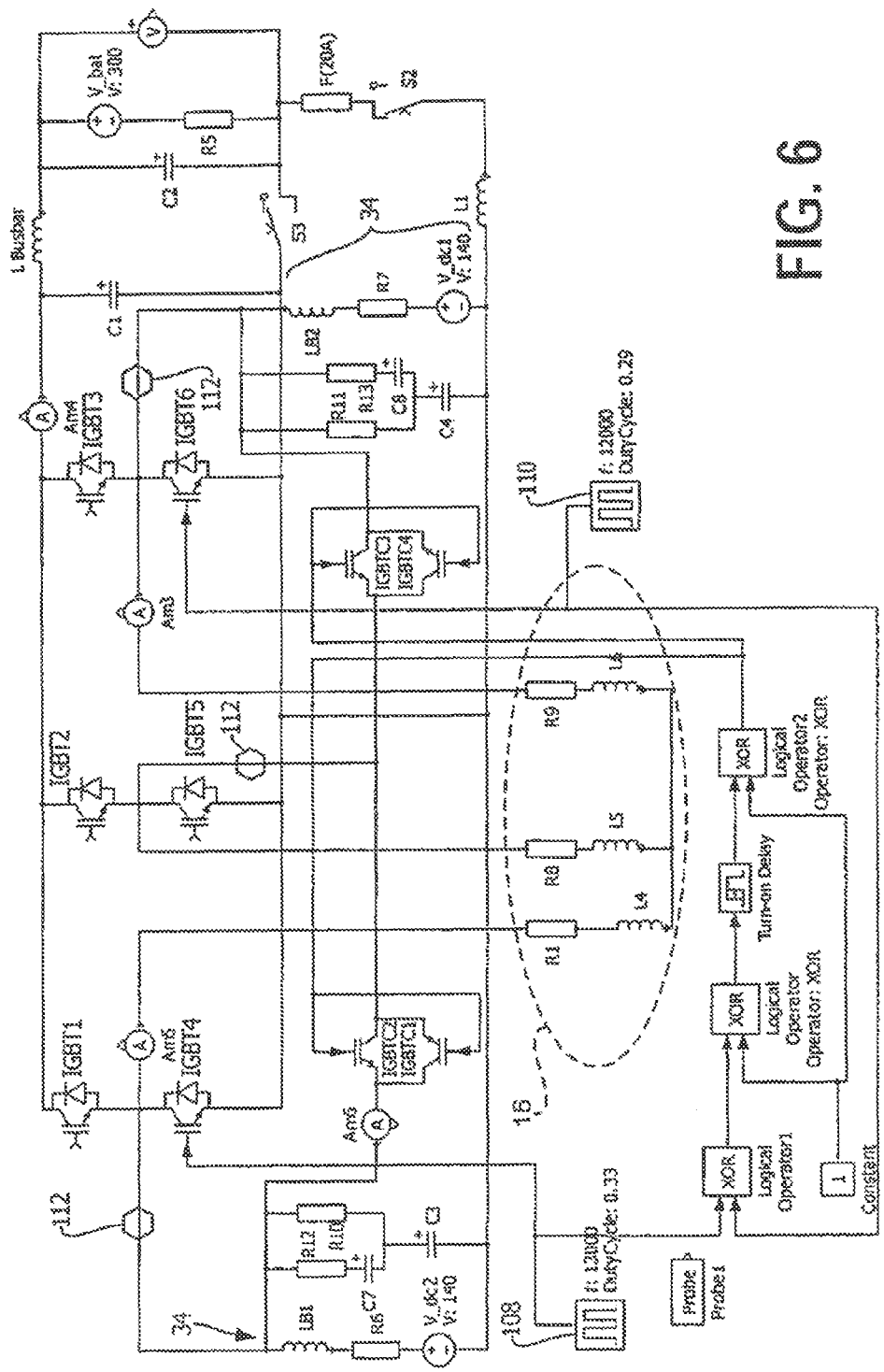
FIG. 6 is a third topology of the driver circuit.

A series of alternative timing patterns and circuit configurations for the charging-mode IGBT driving function are shown in FIGS. 4, 5, and 6. These arrangements realize different benefits and illustrate design evolution. In each of the three figures, two charging circuits from mains power have been rectified, then chopped at a high rate. The high chopper frequency may represent a preferred choice to reduce the size of the magnetics in the charger circuit. The exemplary implementations show one chopper that drives one transformer that has two secondaries. Each secondary output is rectified and filtered. The circuits collectively form two outputs V_dc1 and V_dc2 that are thereafter connected to nodes within the hybrid as well as to at least two of the motor windings. The freewheel diodes connected across IGBT1, IGB2, and IGBT3 direct the charge pulse energy to the battery 12, while the pulse circuit 98 drives the lower IGBTs 22 to inject compensating transients.

As noted in application PCT/US2011/055972 filed Oct. 12, 2011, with the same assignee as the present application, a high switching frequency increases chopper circuit transistor slew time relative to time spent with the transistors fully in the on or the off state. Since the signal path through the transistor appears ohmic during slew time, energy is dissipated, which tends to lower efficiency. This may be seen as acceptable during charging, since charging is mains-connected and thus not a factor in vehicle range, for example. Since the chopper circuit is the excitation for a transformer that carries the full charging current, the chopper input current waveform is not linear. Moreover, by design, the rate of charge may be selected to be on the order of one-tenth of the rate of discharge, so heat dissipation within the circuitry envelope may be significantly lower during charging than during motoring, notwithstanding the lower efficiency resulting from using a chopping switch rate that is higher than the motoring PWM switch rate. It is anticipated that future evolution in semiconductor technology will increase switching speeds and slew rates, ultimately rendering this tradeoff moot.

The schematics of FIGS. 4, 5, and 6, as discussed herein, represent only the charge mode, for exemplary implementations termed Topologies #1, #2, and #3. FIG. 5 represents the second such exemplary implementation, termed Topology #2. For Topology #2, the charger function 34 output of FIG. 1 (V_dc1 and Vdc2 and their associated simulation components in the representation of FIG. 5) is applied to all three of the tie points between the IGBT pairs. As one consequence, all three of the freewheeling diodes shunting across IGBT1, IGBT2, and IGBT3, respectively, can carry current to the battery 12 (V_bat and associated simulation components in FIG. 5), which can distribute the heat load more broadly across the hybrid, dependent upon the exact electrical characteristics of the components involved. To extend this explanation, note that even a few milliohms of increased resistance may measurably increase the voltage drop on each conductive segment, screw joint, or weld discontinuity, when tens of amperes are carried. Similarly, each diode die may have a slightly different forward drop. Higher-drop dice can become hotter and still higher in voltage, further decreasing their current until equilibrium is reached. Thus, heat distribution, even with matched components and uniform layout, is inherently uneven. Increasing the number of current paths employed, as in FIG. 5 compared to FIG. 4, can be beneficial, but requires attention to both design and workmanship to realize as much gain as possible.

FIGS. 4-6 address novel aspects of operation in greater detail. A significant improvement realized in some exemplary implementations of the disclosure features one or more bucking signals (not shown in FIG. 1), timed with reference to the charging signal, and applied to one or more of transistors IGBT1-IGBT6 that would otherwise not turn on during charging (Note: At the schematic level, uniquely labeled devices are referred to herein using standard component label nomenclature in lieu of reference numerals, such as "IGBT2 freewheel diode cathode," for example). Bucking signals (represented in FIG. 4 by a pulse generator function 98) have been shown to appreciably reduce spike magnitude. Hybrid component transistors IGBT1-6 of FIG. 4 remain connected to windings La, Lb, and Lc of the motor 16 at the respective tie points IGBT1-emitter/IGBT4-collector, IGBT2-emitter/ IGBT5-collector, and IGBT3 -emitter/IGBT6-collector. The charger circuits represented by V_dc1, lump resistance model RL1eq, and inductor L1, and by V_dc2, RL2eq, and L2, respectively (L1 and L2 corresponding to the boost inductors 44 of FIG. 1), are shown also to be connected to the respective tie points between IGBT2-emitter/IGBT5-collector and IGBT1-emitter/IGBT4-collector. Charge current from the two charger circuits passes through the freewheeling diodes of IGBT1 and IGBT2 to the battery V_bat. This allows the pulse generator 98 to apply transient pulses that draw the battery charging nodes toward ground, with the pulses summing with and thus offsetting transient spikes in the charging waveform. The inductance of the motor windings La, Lb tends to further reduce the transients. The presence of identical, same-phase pulses on two windings of the motor 16 allows the motor 16 to be used as a set of inductors without inducing net torque in the motor 16.

Viewing FIG. 4 another way, the two charging signals V_dc1 and V_dc2 are conducted to the positive terminal of the battery 12 through freewheeling diodes, IGBT1 anode to cathode and IGBT2 anode to cathode. The gates of IGBT4 and IGBT5 are connected to a pulse source 98, so the energy present at two windings in the motor 12 is a combination of the chopped and rectified V_dc1 and V_dc2 signals and compensating pulses at the pulse source 98 rate. Because the energy pulses applied to the two affected motor windings are effectively synchronous, they do not induce torque in the motor. However, the series inductance, wiring resistance, and shunt capacitance of the respective motor windings and surrounding circuitry create complex (i.e., real and imaginary) load current. This develops transients that can counter the tendency for charging voltage spikes to be applied to the battery.

The above-described arrangement may be viewed as a user option. Having more than one chopper transformer secondary and associated rectifier function provides partial redundancy at low cost. The dual-output configuration also allows the user to establish phase difference between the outputs to increase pulse overlap and improve filtering. These represent alternative design strategies.

As an evolution of Topology #1, the pulse function 98 in FIG. 5 drives the gates of all three "lower" IGBTs 22 (as identified in FIGS. 1 and 3), namely IGBT4, IGBT5, and IGBT6, causing the same transient to be applied to all three of the tie points through which the battery 12 (V_bat in the simulation models shown in FIGS. 4, 5, and 6) is charged. The effect of this charging transient compensation is somewhat improved over that of Topology #1, with a broader range of pulse timings and duty cycles out of the pulse generator function 98 being able to be applied without generating motor torque.

The arrangement shown in FIG. 5 differs in that all of the motor windings receive current from both power supplies simultaneously, along with the battery through all three upper freewheeling diodes. The same pulse is applied to all three lower IGBTs 22, which provide transient bucking signals with heat losses distributed through all three lower IGBTs 22. It is to be understood that the circuit arrangements shown in FIGS. 4, 5, and 6 are taken from simulation models, and represent the connections during charging. Signal paths marked with hexagons 112 are interrupted while the battery is driving the motor and the charging circuitry 34 is disconnected from the mains supply 36 (see FIG. 1). In a production environment, other components (not shown) may be used to interrupt connection between the charging circuits 34 and the IGBTs of the hybrid, while other pulse width modulation timing signals in the pulse generators 108, 110 are generated and applied for excitation of all six of the IGBTs in the hybrid at the times necessary to drive the motor 12 with a selected force level.

FIG. 6 shows a further evolution of the above-described concept, termed Topology #3, wherein the timings of the charging pulses (the V_dc1 and V_dc2 signals) into the tie points between IGBT1 and IGBT4 and between IGBT3 and IGBT6 are distinct from one another, and the timing of the charge pulses into the tie point between IGBT2 and IGBT5, the middle pair, is gated by charge timing IGBTs IGBTC1-IGBTC4. The gated charging function allows the charge waveforms of other topologies to be replicated by disabling the charge timing IGBTs—i.e., with no charging pulses reaching the tie point between IGBT2 and IGBT5—or to provide a unique charging pattern where the IGBT2/IGBT5 tie point pulse is driven by any logical and time-delay combination of the two pulse generator patterns. The circuit shown drives the charge timing IGBTs with the XOR of two similar-duration pulses that repeat their pulse pattern at a 1000 Hz rate.

FIG. 6 further shows other aspects of implementations of the disclosure. As noted above, the pulse timings for the two pulse generators differ, providing different pulse signal harmonics to the motor 16 and the battery 12. Unique pulses are applied to the gates of IGBT4 and IGBT6, while a logic combination is applied to the IGBT5 gate. The logic combination shown is not necessarily optimized for any particular user-selected combination of battery, charger, hybrid, motor size, and operating temperature. FIG. 6 further shows two RC networks R10, R12, C7, C3 and R11, R13, C8, C4, with the respective networks shunting across the IGBT1/IGBT4 and IGBT3/IGBT6 tie points. These networks, when optimized for response, add at least one additional pole to the charge network and appreciably increase charging efficiency. The RC networks at least beneficially redirect charging energy from dissipative paths to the battery 12 and decrease transient perturbations evident in the windings L4, L5, and L6 of the motor 16.

Figure 7:
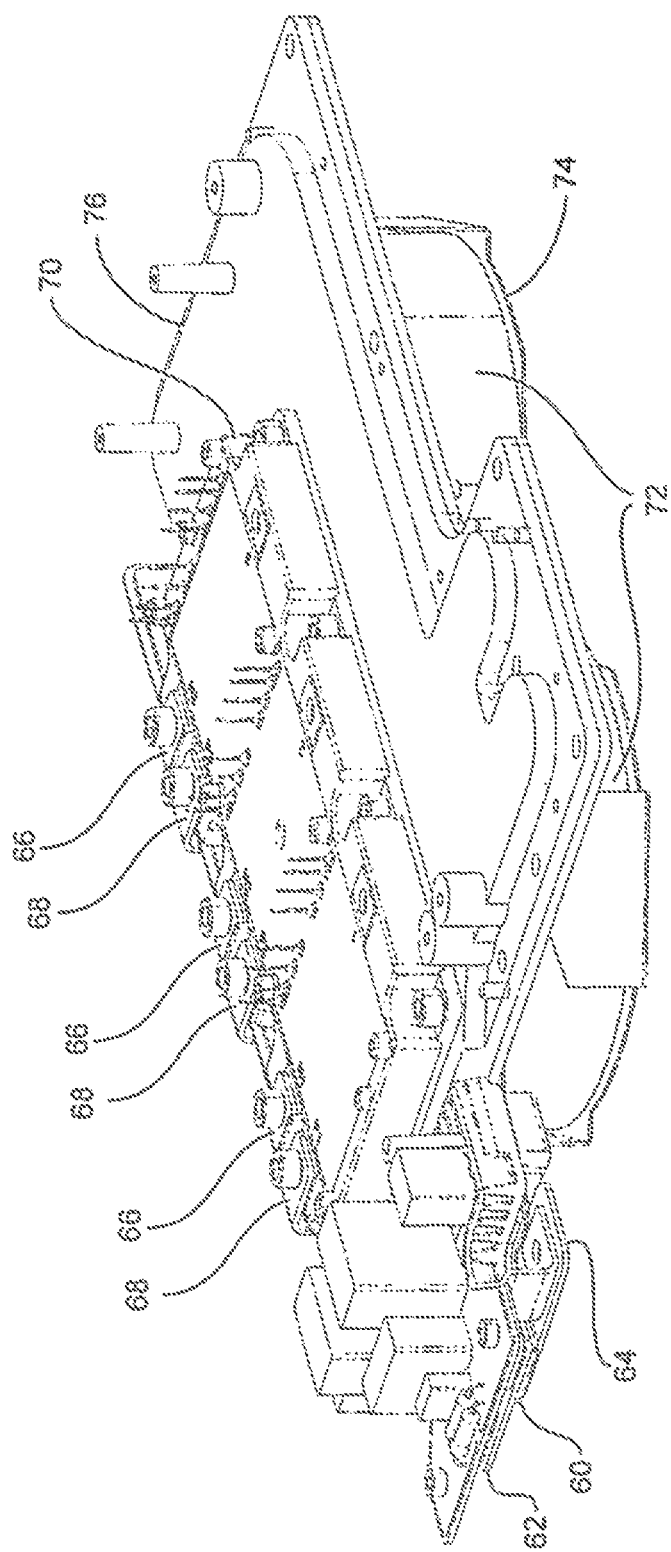
FIG. 7 is a first perspective view of a combined battery charging and motor driving subsystem according to some aspects of an exemplary implementation.
Figure 8:
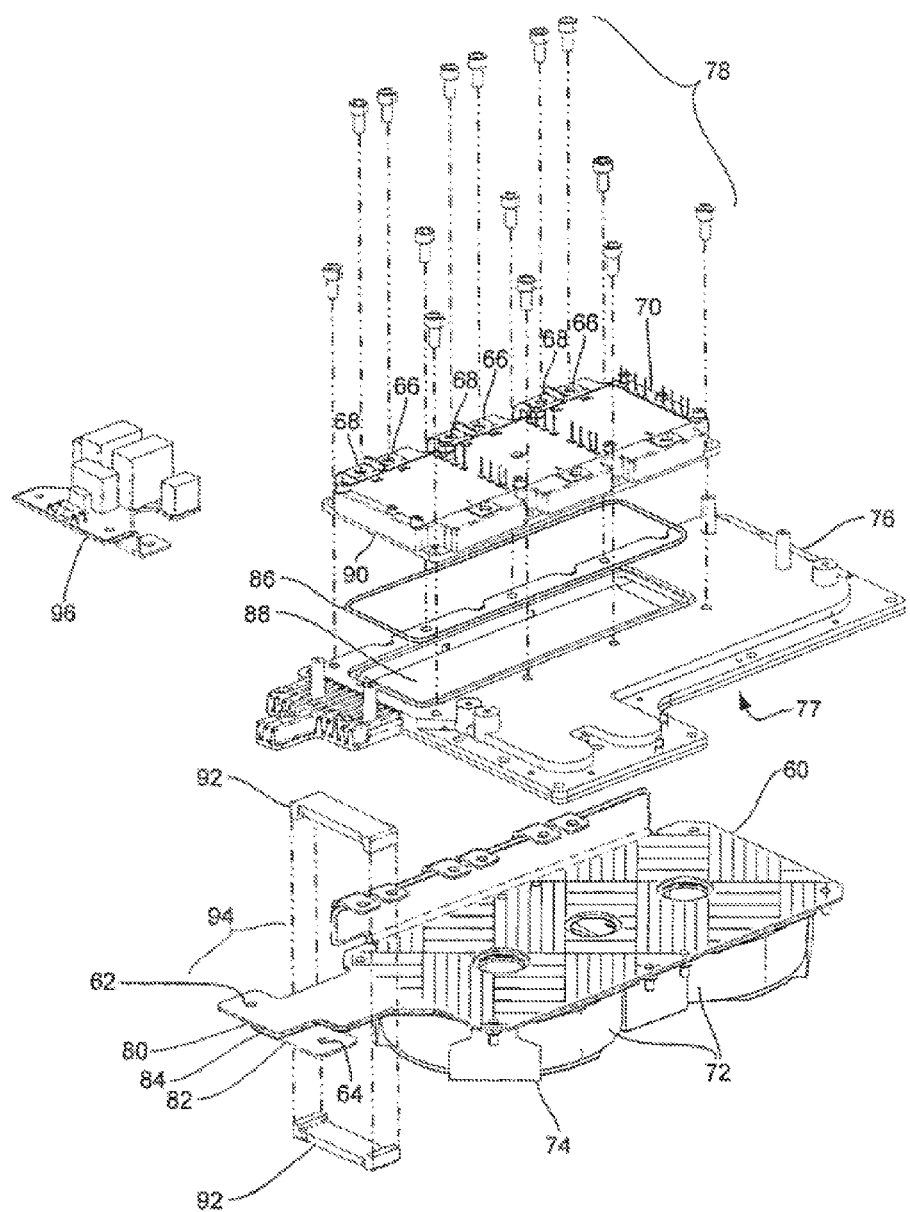
FIG. 8 is a second, exploded perspective view of the subsystem of FIG. 7.

FIG. 7 illustrates a solution to a second issue addressed by some exemplary implementations of the disclosure. Charging power is directed from the mains supply 36 via the front-end filter 38, the isolator 42, and the booster inductors 44, all of which, along with the respective IGBTs 20, 22, are shown schematically in FIG. 1. As shown in FIG. 7, a "fish tail" bus bar 60 carries the reference current from discrete tie points 62 (positive) and 64 (negative) to the connection terminals 66 (emitters) and 68 (collectors) of a unitary six-IGBT hybrid block 70. The IGBT hybrid block 70 is of conventional configuration, such as the Infineon™ FS800R07A2E3, a device featuring a HybridPACK2™ housing, with, which the particular bus bar 60, shown in part in FIG. 7 and best seen in FIG. 8, is designed to mate. The associated capacitors 72, along with their adapter bracket 74 and an associated cold plate 76, complete the structural core of the exemplary implementation. For each equivalent IGBT array that is dimensionally different, bus bar 60 and cold plate 76 configuration may likewise differ to a greater or lesser extent from those shown, but the key features, as discussed below, apply to any six-IGBT array with comparable capability and broadly similar arrangement, as well as to arrangements of single, dual, and triple IGBTs, hybrid or integrated, that may be mounted to a common bus bar 60 of any arrangement and that share a cold plate 76.

The capacitors 72 are of a specific style characterized as having an annular form factor and a high discharge rate, and being of metalized polypropylene film type. The bracket 74 is purpose-developed for providing electrical and thermal contact for two units of one particular size of the indicated type of capacitor. The capacitors 72 fitted between the bus bar 60 and their bracket 74 are selected to exhibit electrical properties that realize significant ripple suppression, and thereby to reduce stress on the battery 12, when compared to previous charging circuit filter configurations.

The selection of a pair of identical, smaller-diameter, lesser-thickness capacitors 72 in place of, for example, one larger-size capacitor having comparable capacitance. equivalent series resistance (ESR), equivalent series inductance (ESL), and voltage withstanding capability, makes the capacitor subassembly more similar in size to the mating subassembly, the IGBT hybrid 70, and the associated cold plate 76. The arrangement farther serves to increase and distribute the electrical contact surface area between the respective capacitor 72 electrodes and both the adapter bracket 74 and the affected layer of the bus bar 60, as well as to shorten the effective path length from the capacitors 72 to the bus bar 60. Previous strategies for achieving comparable capacitance have employed larger numbers of physically smaller and conventional annular-lead capacitors (see U.S. Pat. No. 7,046,535, for example), which add resistance as well as reactance in interconnecting conductors, and have appreciably greater ESR and ESL in the capacitors themselves. It is anticipated that other forms and arrangements of battery charging current shunt capacitors 72 and other filtering configurations may achieve ripple suppression performance comparable to that achieved with the arrangement indicated. The exemplary implementation shown in FIGS. 7 and 8 exhibits a combination of high capacitance, high voltage withstand, very low ESR and ESL for selected capacitors, and a very low resistance, low inductance mounting and current transfer bracket that exceeds the performance of previous concepts, including some to which similar capacitors have been applied.

FIG. 8 illustrates in exploded form the exemplary implementation of FIG. 7, namely the bus bar 60, the capacitors 72, the cold plate 76, the capacitor adapter bracket 74, the IGBT hybrid 70, and fastenings 78 to assemble the components.

The inductance of the portion of the link from the IGBT hybrid 70 to the battery 12 allocated to the power switching apparatus itself, as opposed to wiring from the apparatus outputs to the battery 12, is a factor in preventing or allowing charging current waveform overshoot, with greater series inductance being associated with undesirable battery stress. A component design goal for the bus bar 60 on the order of 10 nH-12 nH is practical with exemplary implementations of the present disclosure. This low value of series inductance is not commonly realizable with previous designs. Previous practice might achieve 30 nH, for example, with the relatively high value attributable to use of longer, individual conductors further separated from one another. Implementations of the present disclosure such as those in FIG. 6 have a laminated bus bar 60 with a generally flat top surface and a generally flat bottom surface. For this application the term "bus bar" refers to positive 80 and negative 82 conductors closely and uniformly spaced using flat conductive material of sufficient width and thickness and sufficiently smooth peripheral shape to have both low DC resistance and good suppression of radiated noise. Implementations further have a preferred dielectric material forming a uniform separator 84 between the conductors 80, 82, contributing desirable distributed shunt capacitance while augmenting stiffness at low weight. In some implementations, a selected dielectric material may permit assembly of the bus bar 60 in flat form, followed by bending the bus bar 60 into the shape shown in FIGS. 7 and 8 without appreciable degradation of electrical or mechanical performance.

An additional attribute potentially realized in a laminated bus bar 60 having the necessary configuration is management of common mode (CM) noise, as measured in terms of common mode rejection ratio (CMRR). Previous practice separated positive and negative terminals while forming switch-mode signals at points separated relatively widely in space. The design disclosed herein connects at least some potential sources of common-mode signals by a set of short, parallel paths to the laminated bus bar 60. The short paths truncate, while the close parallel paths reduce the area of, the equivalent of a large loop antenna that might carry charging-mode and operating-mode currents (hundreds of amperes, tens of kilohertz) with appreciable switching transients in other implementations. The indicated configuration significantly decreases emission of CM noise.

At the bus bar 60, current flow through the finite resistance of the IGBT devices of the hybrid dissipates heat as a consequence of operation. Waste heat is preferably dissipated using conductive cooling with a forced-water jacket, termed herein a cold plate 76. The cold plate herein has a substantially flat bottom surface and a varied top surface wherein a raised aperture 88 which forms a cooling well and other features provide a varied topographic surface of non-homogeneous flatness as opposed to the generally flat bottom surface. The cold plate 76 has an O-ring 86-sealed aperture 88 into which a part of the IGBT hybrid 70 is inserted. This part of the hybrid 70 aligns generally with the pass transistors and freewheeling diodes within. The cooling well which the aperture 88 opens into is a part of an interior fluid path within the cold plate 76 that admits cooling fins (not visible) on the IGBT hybrid bottom plate 90. Flowing water—or any coolant fluid, preferably an antifreeze-and-water blend in many applications—couples the heat from the bottom plate 90 of the hybrid 70 and may be carried to a distal radiator (not shown) for transfer to ambient air, for example. The generally flat, substantially rectangular bus bar 60 contacts the cold plate 76 on the side of the cold plate 76 opposite the hybrid 70, and beyond the bus bar 60 is the capacitor pair 72. By establishing sufficient stiffness and precision of alignment, it is possible to establish relatively efficient thermal coupling between these components, so that their temperatures are relatively uniform, nearly equal, and determined to a significant extent by the temperature of the coolant carried through the cold plate 76.

The width of the bus bar 60, in this implementation as indicated above, is determined in part by the diameter of the two capacitors 72. In order to effectively provide cooling for these devices, the generally flat bottom surface of the cold plate 76 may have about the same surface area and shape as the top surface of the bus bar. In some instance the flat bottom surface of the cold plate may be larger than the top surface of the bus bar and in yet other instance the cold plate bottom surface may extend over the edges of the bus bar. In all case the bottom of the cold plate has a surface area substantially larger than the aperture 88 that receives the IGBT hybrid 70 cooling fins. Accordingly, a higher value of thermal coupling is achieved than is possible with a cold plate 60 that closely conforms to the size of the hybrid 70. Thermal coupling is further enhanced by an electrically insulating and thermally conductive pad 77 (located on the bottom face 90 of the cold plate 60, and contacting approximately the hatched area on the bus bar 60). With the fastenings 78 properly tensioned, the pad 77 can significantly increase heat transfer, lowering the capacitor 72 temperature.

There is an additional filter subassembly 92 surrounding the fishtail 94. The filter 92 includes two half-blocks of a selected "soft" ferrimagnetic material composition that are assembled and clamped together to form a flattened, generally rectangular ring or loop (a "ferrite bead"), and that further attenuate common-mode noise in paired conductors passing within. Because the bus bar 60 layout in the exemplary implementation is defined by flat conductors, a ferrite "bead" configured to clamp around ribbon cable may be applied around the fishtail 94 as shown with scant adaptation. Choice of ferrite material, composition, and placement on the fishtail may be varied depending on the spectral content of noise to be suppressed and/or the intended usage.

Perched above the two lugs 62, 64 and the associated laminated conductor 94 that jointly make up the "fishtail" of the bus bar 60 is a so-called X/Y capacitor assembly 96. This includes a shunt capacitor from each battery voltage, and thus each bus bar layer, to a ground terminal, plus a shunt capacitor between the bus bar layers proximal to the lugs 62, 64.

The above electrical noise suppression components serve to address radiated noise reduction goals with minimal size (weight, volume), while exceeding the established performance standards of the art. Additional electrical noise suppression components can be added, and may further improve electrical quieting.

As of the time of filing of the instant patent application, representative batteries 12 for battery-powered vehicles are used and recharged with long life only if considerable attention is paid to individual cell temperatures, voltages on cells and/or cell stacks, and other dynamic physical properties of the cells as a way to estimate the state of the cells' internal chemistry. In addition to sensing cell temperature and voltage while applying current, the cells, the stacks, or the entire battery 12 may be periodically disconnected from the charge function and briefly connected to a load with current and voltage measured, the results of which can provide more data to tailor the charge rate.

During motor 16 operation, it is assumed that there will not be mains input 36. Since motor operation in vehicular apparatus incorporating some exemplary implementations of the disclosure implies vehicle motion, wired feed is seen as impractical for the categories of devices toward which the disclosure is primarily directed. Obviously, for exemplary implementations serving fixed operation of mains/battery powered equipment, transition from battery to mains input is feasible, and switchover apparatus may be required. Moreover, wireless ("beamed") power distribution is feasible, but implies a technology that may be seen as equivalent to operation from mains power from the point at which interaction with the inventive concept is addressed. For vehicular, mains-recharged applications, it is generally sufficient to provide a mechanical interlock or an electronic sensor-based equivalent that prevents simultaneous application of recharging SMPS signals and battery signals.

While the method and devices have been described in terms of what are presently considered to be the most practical, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures, The present disclosure also includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the underlying concepts, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element, disclosed, should be understood to encompass a disclosure of the action which that physical element facilitates.

Any patents, publications, or other references, mentioned in this application, for patent, are hereby incorporated by reference. In addition, as to each term used, it should be understood that, unless its utilization in this application is inconsistent with such interpretation, common dictionary definitions should be understood, as incorporated, for each term, and all definitions, alternative terms, and synonyms such as contained in at least one of a standard technical dictionary recognized by artisans and the Random House Webster's Unabridged Dictionary, latest edition, are hereby incorporated by reference.

Finally, all references, listed in the Information Disclosure Statement or other information statement filed with the application, are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard, it should be understood that, for practical reasons, and so as to avoid adding potentially hundreds of claims, the applicant has presented claims with initial dependencies only.

Support should be understood to exist, to the degree required under new matter laws,—including but not limited to United States Patent Law 35 USC 132 or other such laws,—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

What is claimed:

1. A battery charger and motor driver assembly comprising:
   positive and negative output terminals for charging a battery;
   a traction motor configured to accept a pulse width modulated (PWM) drive;

a transistor array comprising a plurality of transistor pairs, wherein a collector of a first transistor is connected to the positive output terminal, wherein an emitter of the first transistor is connected to a tie point connected to a collector of a second transistor, the emitter of the second transistor being connected to the negative output terminal, wherein a number of the plurality of transistor pairs is the same as a number of phase inputs that the traction motor is configured to accept;

a charging source of chopped and rectified direct current (DC) having positive and negative output terminals, the positive output terminal being connected to the tie point of at least one pair of transistors in the transistor array, the negative terminal being connected to the battery negative output terminal; and a control circuit configured to apply a discrete PWM drive signal to the gate of a transistor in the transistor array, the drive signal being applied to the transistors of the transistor array when a battery connected to the positive and negative output terminals is driving the motor, and the control circuit applying a pulse pattern to the gate of at least one transistor of the transistor array when the charging source is charging a battery connected to the positive and negative output terminals.

2. A method for combining a charger and an inverter in a motor driver circuit, comprising:

using a PWM control signal to turn transistors on and off at times that collectively apply a drive signal to a load, the drive signal providing a number of phases and power levels for which the load is defined; and recharging, using a charge function from a mains power source, a portable rechargeable electrical source from at least one tie point, wherein the charge function applies at least one pattern of transient pulses to a gate of a transistor of a pair of the transistors, the timing of the transient pulses being synchronized to a chop timing of a converter for the mains power source, the converter configured to chop and rectify DC power at a level compatible with the recharging;

wherein:
the portable rechargeable electrical source has a positive and a negative terminal;
the load has electrical load characteristics of a traction motor, the load being capable of accepting a pulse width modulated (PWM) AC signal having a plurality of phases; and
the transistors are arranged as an array of pairs of transistors, the pairs joined at a tie point between an emitter of a first respective transistor and a collector of a second respective transistor, the collectors of the first transistors of the respective pairs tied together and further tied to the positive terminal of the portable rechargeable electrical source, with the emitters of the second transistors of the respective pairs tied together and further tied to the negative terminal of the portable rechargeable electrical source, and the tie points connected to respective passes of the load.

3. A combined charger and inverter for a motor driver circuit, comprising:

means for converting a mains power source to a direct current output having a level compatible with recharging a portable rechargeable electrical source, wherein the means for converting comprises one or more boost inductors, each boost inductor connected to a positive output terminal or a negative output terminal of the direct current output;

means for applying a drive signal to an output load having electrical load characteristics of a traction motor;

means for receiving a pulse width modulated (PWM) AC signal having a plurality of phases;

means for switching between applying a drive signal from the portable rechargeable electrical source to the output load and passing the direct current output to the portable rechargeable electrical source;

wherein the means for switching does not include a mechanical disconnect configured to isolate between the mains power source and the output load.

\* \* \* \* \*